K. OWSIANIECKI.
WATER BICYCLE.
APPLICATION FILED MAY 12, 1921.
1,409,965.  Patented Mar. 21, 1922.
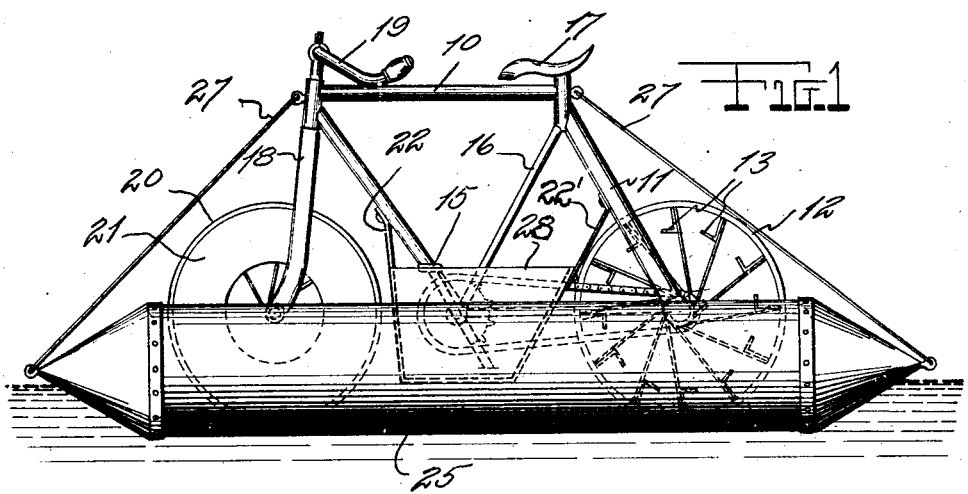
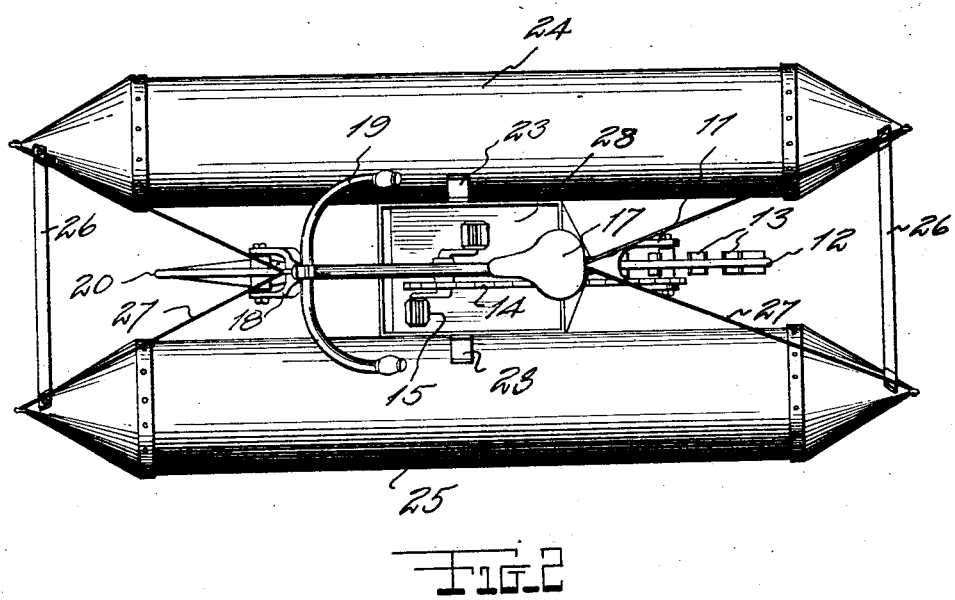

UNITED STATES PATENT OFFICE.

KAROL OWSIANIECKI, OF BALTIMORE, MARYLAND.

WATER BICYCLE.

1,409,965. Specification of Letters Patent. Patented Mar. 21, 1922.

Application filed May 12, 1921. Serial No. 469,071.

*To all whom it may concern:*

Be it known that I, KAROL OWSIANIECKI, a citizen of the United States, residing at Baltimore, in the county of Baltimore City and State of Maryland, have invented certain new and useful Improvements in Water Bicycles, of which the following is a specification.

This invention relates to improvements in manually propelled boats and has for its principal object to provide a device designed to exercise the leg muscles of the user and to afford amusement.

Another object of this invention is to provide a means for protecting the feet and ankles of the user from becoming wet.

With these and other objects in view the invention consists in the novel construction, combination and arrangement of parts which will be fully set forth in the following specification, claimed and illustrated in the accompanying drawing, in which.

Figure 1 is a side view of the improved boat, and

Figure 2 is a top plan view of Figure 1.

Referring to the drawings by characters of reference the numeral 10 designates the main frame of the device which is constructed in the ordinary diamond shape commonly used for bicycles. The rear leg 11 of the frame is bifurcated in the approved manner and mounts a wheel 12, to the spokes of which are secured the L shaped paddles 13. The wheel is rotated by the usual sprocket and chain mechanism 14 which is operated by the customary pedals 15 mounted at the lower ends of the saddle post 16. A saddle 17 is adjustably mounted at the upper end of the post 16 as clearly shown in the drawing.

Pivotally mounted in the forward end of the frame is a fork 18, the upper end of which is provided with handle bars 19 while the lower end mounts a steering wheel 20. A web 21 covers the spokes of the wheel 20 to provide a rudder by means of which the course of the device is controlled.

A box like guard 28, the upper side of which is open is secured to the frame 10 by means of brackets 22—22′ and partially incloses the forward sprocket to exclude water therefrom. Secured to opposite sides of the guard 28 are brackets 23 which are riveted or otherwise attached intermediate the ends of cylindrical floats 24 and 25, which are held in spaced parallel relation by bars 26. Guy rods 27 are attached to opposite ends of the frame and to opposite ends of the floats to hold the frame rigid.

While in the foregoing there has been shown and described the preferred embodiment of this invention, it is to be understood that minor changes in the details of construction, combination and arrangement of parts may be made without departing from the spirit and scope of the invention as claimed.

What is claimed is:

A manually propelled boat comprising a pair of cylindrical floats having uniform conical ends, rods connecting the floats at opposite ends and holding the same in spaced parallel relation, a guard secured between the floats intermediate their ends, a bicycle frame secured to the floats directly over the guard, a webbed wheel mounted between the forks at the forward end of the frame, a wheel between the forks at the rear of the frame, said wheel having tangential spokes, angular paddles carried by the spokes of the last named wheel, said paddles extending outward at both sides of said spokes, the lower portions extending at right angles thereto, and means partially inclosed by the guard to drive the last named wheel.

In witness whereof I affix my signature.

KAROL OWSIANIECKI.

Test:
C. M. ZACHARSKI.